United States Patent Office

3,485,755
Patented Dec. 23, 1969

3,485,755
LUBRICATING COMPOSITIONS INCLUDING A POLYMER WHICH CONTAINS AN AMMONIUM SULFATE SALT
Donald C. Grimm, Cuyahoga Falls, Ohio, and Leonard Pierce, Jr., St. Albans, W. Va., assignors to Union Carbide Corporation, a corporation of New York
No Drawing. Filed Sept. 11, 1967, Ser. No. 666,945
Int. Cl. C10m 1/38; C08f 3/84
U.S. Cl. 252—47.5                    5 Claims

ABSTRACT OF THE DISCLOSURE

There is disclosed lubricating compositions containing as additives ammonium sulfate salts of various polymers. The polymers include copolymers of oil-solubilizing acrylates and ammonium sulfate containing monomers, and polybutenyl succinimide ammonium salts. The additives enhance the detergent characteristics of hydrocarbon oils and, in some cases, also the viscosity index of the oil.

---

The invention relates to lubricating compositions that contain a polymeric additive as a dispersant, and in some cases, as a viscosity index improver also. In one aspect, the invention relates to hydrocarbon lubricating oils that contain as additives copolymers of an oil-solubilizing monomer and an ammonium sulfate salt. In another aspect, the invention relates to hydrocarbon lubricating oils containing sulfate salts of polybutenyl succinimides.

Internal combustion engine lubricants are being called upon to perform at high levels of efficiency over increasingly long periods of time. Polymeric and other additives are employed in such lubricants to improve the viscosity index, to increase the detergency and the dispersant properties of the oil, to increase the load-bearing properties of the oil, and the like. This invention is concerned in one aspect with a polymeric additive that serves the dual purpose of being a viscosity index improver and a dispersant, and in another aspect with an additive having improved dispersant properties.

The polymeric additives of the first aspect of the invention are copolymers (i.e., polymers of two or more monomers) of an oil-solubilizing monomer and a monomer imparting dispersant properties to the oil.

The oil-solubilizing monomer is normally a long chain (e.g., $C_8$–$C_{20}$) alkyl acrylate or methacrylate. Specific illustrative examples include octyl acrylate, nonyl methacrylate, isodecyl acrylate, decyl methacrylate, undecyl acrylate, lauryl acrylate, tridecyl methacrylate, myristyl acrylate, palmityl acrylate, stearyl acrylate, stearyl methacrylate, eicosyl acrylate, and the like. It may be desirable to employ a mixture of two or more oil-solubilizing monomers. For instance, it is desirable in some cases to employ an alkyl acrylate or methacrylate wherein the alkyl has at least 16 carbon atoms in combination with a shorter chain alkyl (e.g., $C_{10}$–$C_{12}$) acrylate or methacrylate. The longer chain alkyl group help to increase the dispersant capacity of the polymer in order to help to prevent the polymer from losing oil-solubility by association with the partially oxidized products of combustion that constitute the major proportion of engine sludge. It is thus desirable that least 15 weight percent, preferably at least 20 weight percent, and more preferably at least 30 weight percent of the oil-solubilizing monomer be an alkyl acrylate or methacrylate wherein the alkyl has 16 or more carbon atoms. A mixture of stearyl acrylate and isodecyl acrylate is a preferred oil-solubilizing monomer mixture.

It may also be desirable to include a small amount of a short chain alkyl acrylate or methacrylate in the polymer in order to enhance the viscosity index improving properties of the polymer. Specific illustrative examples include methyl methacrylate, methyl acrylate, ethyl methacrylate, isopropyl acrylate, butyl acrylate, and the like. Methyl methacrylate is preferred. The short chain (e.g., $C_1$–$C_4$) alkyl acrylate or methacrylate is usually used in small amounts, for example, from about 3 to 15 weight percent of the total polymer weight.

The copolymer of the invention also contains an ammonium sulfate that comprises the reaction product of an amine and dimethyl or diethyl sulfate. The amines contemplated are those that contain olefinic unsaturation and are therefore copolymerizable with the oil-solubilizing monomer. Such amines include vinyl pyridines such as 2-methyl-5-vinylpyridine, amine-containing acrylates or methacrylates such as N,N-dimethylaminoethyl acrylate, N,N-dimethylaminoethyl methacrylate, 1-methyl-2-(N,N-dimethylamino)-ethyl acrylate, N,N-diethylaminoethyl acrylate, N-methylaminoethyl acrylate, and the like. The vinyl pyridines are preferred.

It is preferred to first prepare the amine-containing copolymer, and then add dimethyl sulfate or diethyl sulfate to the copolymer to form the ammonium sulfate salt. The dimethyl or diethyl sulfate is preferably employed in equivalent amounts, that is, one mole of dimethyl or diethyl sulfate per equivalent of amino groups in the copolymer. The ammonium sulfate salt is formed by simple addition of dimethyl or diethyl sulfate to the copolymer. Of the two alkyl sulfates, the dimethyl sulfate is preferred.

The ammonium sulfate is present in the copolymer in an amount sufficient to enhance the detergent properties of the copolymer. For instance, the ammonium sulfate can be used in amounts of from about 3 to 15 weight percent, based on weight of copolymer.

The copolymer of the invention can be produced by conventional polymerization techniques. For instance, the monomers can be mixed in the desired proportions along with a polymerization initiator. The polymerization reaction is then usually started by heating the reaction mixture to a temperature of at least the activation temperature of the initiator. The specific temperature employed will, of course, vary with the nature of the monomers and the initiator, but is usually within the range of from about 40° to about 110° C.

Polymerization initiators that can be employed include peroxides and azo compounds. Examples include t-butyl peroxypivalate, benzoyl peroxide, methyl ethyl ketone peroxide, t-butyl hydroperoxide, t-butyl perbenzoate, cumene hydroperoxide, azodiisobutyronitrile, dimethylazodiisobutyrate, isopropylperoxydicarbonate, and the like. Also useful are combinations of quaternary ammonium salts and peroxides. Examples of such salts include diisobutylphenoxyethoxyethyl-dimethylbenzyl ammonium chloride, lauryldimethylbenzyl ammonium chloride, and the like. The polymerization initiator is employed in conventional amounts, such as from about 0.05 to about 0.5 weight percent, based on weight of monomers.

It is usually convenient to carry out the polymerization in a solvent such as pentane, hexane, heptane, octane, xylene, toluene, benzene, naphtha, or the like. When a volatile solvent is employed it can be distilled at the conclusion of the polymerization after oil has been added to the copolymer solution. This procedure produces a concentrated solution of the copolymer in oil and is a very convenient way to recover the polymer.

The molecular weight of the copolymer that is useful in the invention is usually expressed in terms of reduced viscosity ($I_r$). Reduced viscosity is defined by the equation:

$$I_r = \frac{T - T_0}{T_0(c.)}$$

wherein T is the time required for a low concentrate copolymer solution to pass through a standard Ubbelohde viscometer, $T_0$ is the time for the pure solvent to pass through the viscometer, and c. is the concentration of the copolymer in grams of copolymer per 100 milliliters of solvent. Unless otherwise specified, the reduced viscosities of the copolymers discussed herein were determined in a solution of 0.1 gram of copolymer in 100 milliliters of benzene at 20° C.

It has been found that the copolymers that are useful in the invention generally have reduced viscosities in the range of from about 0.1 to about 2.

In a second aspect, the invention provides oil additives dimethyl sulfate or diethyl sulfate salts of the addition product of a polyisobutenyl succinic anhydride and a polyalkylenepolyamine having at least two alkylene and three amino groups up to about 6 alkylene and 7 amino groups. The polyethylenepolyamines are the preferred polyalkylenepolyamines, and tetraethylenepentamine is more preferred. These polyisobutenyl succinimides are well known in the art. The salt of the succinimide is prepared simply by adding dimethyl or diethyl sulfate to the polyisobutenylsuccinimide in a manner analogous to that described above with respect to the first aspect of the invention. The polyisobutenyl succinimides used normally have relatively low molecular weights of the order of from about 700 to about 2000.

The polymeric additives of the invention are employed as additives in oils in an amount sufficient to enhance the dispersant characteristics of the oil and, with the first aspect of the invention, also the viscosity index of the oil. Normally, amounts from about 0.5 to about 3 weight percent of additive are employed (percentages being based upon weight of oil). The oils employed are the hydrocarbon oils of lubricating viscosity, whether of natural origin or synthetic. Preferred oils are substantially paraffinic and/or naphthenic, although some aromatic hydrocarbons can be present in the oil. The nature and production of such oils are well known.

It is within the scope of the invention to employ other types of additives in the lubricating compositions of the invention. Antioxidants, extreme pressure agents, pour point depressants, and the like are examples of known types of additives.

The lubricating compositions of the invention are useful in automobile crankcases and as lubricants in other internal combustion engines.

The following example illustrates the invention:

EXAMPLE 1

A copolymer of 3.30 percent 2-methyl-5-vinyl-pyridine and 96.70 percent isodecyl methacrylate was prepared by a solution polymerization in heptane at 70° C. Azobisisobutyronitrile at 0.3 percent was used as the initiator. The conversion of monomer to polymer was 100 percent and the reduced viscosity (0.1 g. polymer in 100 ml. benzene at 20° C.) was 0.34. A final solution of 100 grams polymer and 97 grams heptane was obtained.

One-hundred-eighty-seven grams of this solution and 3.4 grams of dimethyl sulfate were agitated at 70° C. for ten hours. A small sample of the resultant solution was heated at about 120° C. and 1 mm. Hg in a vacuum desiccator for one hour. The reduced viscosity of this polymer, 0.268 was substantially lower than the reduced viscosity, 0.34, of the polymer before it had reacted with dimethyl sulfate.

The above experiments were repeated. The reduced viscosity of the 2-methyl-5-vinyl-pyridine and isodecyl methacrylate copolymer was 0.349. The reduced viscosity of the polymer after it had been reacted with dimethyl sulfate was 0.24.

The two alkylated polymers were mixed together and solvent exchanged into a 200 SUS lubricating oil. A blend of 1.17 prcent of this polymer and 1.0 percent of a zinc dialkyl dithiophosphate inhibitor package (Amoca 193) in a 200 SUS lubricating oil was prepared. The 210° F. viscosity and the viscosity index of this blend were 7.12 centistokes and 108. The blend was evaluated for its sludge dispersancy properties in a Sequence 5 engine test. After 16 hours of testing three parts of the engine, the rocker arm assembly, rocker arm cover plate, and valve deck, were examined and given a 28.9 rating. A 30.0 rating indicates the engine is perfectly clean.

A blend of 1.0 percent of the same inhibitor in the same oil was also prepared. Its 210° F. viscosity and viscosity index were 6.21 centistokes and 95, respectively. This blend was tested ahead of the blend of the polymer of this example. A sludge rating of 27.7 was obtained after 16 hours of testing. The copolymer is thus demonstrated to be a viscosity index improver and a dispersant.

EXAMPLE 2

(a) Into a one pint Pyrex pressure bottle were weighed 7.6 grams dimethyl sulfate, 73 grams heptane, and 50 grams Oronite 1200, a commercial ashless detergent for automotive lubricating oils. The Oronite 1200 is a solution of a low (about 1000) molecular weight polymer in oil. This polymer is prepared by reacting polyisobutenyl succinic anhydride with tetraethylene pentamine. The above bottle was capped and rotated end-over-end in an 80° C. constant temperature bath for eight hours. The bottle was cooled and a sample was dried at 120° C. and 1 mm. Hg in a vacuum desiccator for one hour to remove the heptane and any unreacted dimethyl sulfate. Three grams of this product were dissolved in 97 grams of a 200 SUS lubricating oil. The 210° F. viscosity and the viscosity index of this blend were 7.04 centistokes and 107, respectively. A blend of 3 grams of Oronite 1200 and 97 grams of the same oil was also prepared. The 210° F. viscosity and the viscosity index of this blend were 6.74 centistokes and 98.5, respectively.

These data show that the dimethyl sulfate alkylated the polymer in the Oronite 1200 solution. A new product with slightly better viscosity index properties was obtained.

(b) Another bottle was charged with 200 grams Oronite 1200, 15.2 grams dimethyl sulfate, and 100 grams heptane. After reacting at 40° C. for 24 hours the bottle was cooled to room temperature and the contents poured into a stirred kettle. The heptane and any unreacted dimethyl sulfate were removed by distilling at 1 mm. Hg and 25 to 120° C. Sufficient oil was added to dilute the product to a concentration of 68.3 percent of alkylated Oronite 1200 and 31.7 percent of a 200 SUS oil.

A blend of 291.0 grams of a VI improver, 117.1 grams of the above alkylated Oronite 1200 product in oil at 68.3 percent, 80.0 grams of a zinc dialkyl dithiophosphate inhibitor, and 7512 grams of a 200 SUS oil was prepared. The concentration of alkylated Oronite 1200 is thus 1.0 percent in this blend. The alkylated Oronite 1200 consists of 92.94 percent Oronite 1200 and 7.06 percent dimethyl sulfate. This blend was evaluated for its ability to keep an engine clean in the Low Temperature Sludging engine test. After 174 hours of operation the engine was shut down and inspected. A total sludge rating of 31.9 (50 is clean) was obtained. In another test on a blend differing from this one only in the replacement of the 1.0 percent of the sulfated product with 1.0 percent of Oronite 1200, a rating of 29.6 was obtained after 174 hours of testing. Thus, the product of this invention is a detergent which is slightly more effective than Oronite 1200.

What is claimed is:

1. A lubricating composition which comprises a major amount of a hydrocarbon oil of lubricating viscosity, and a minor amount, sufficient to enhance the detergent characteristics of said oil, of a copolymer of (a) an oil-solubilizing proportion of a long chain alkyl acrylate or methacrylate, and (b) an ammonium sulfate salt which consists essentially of the reaction product of an ethylenically unsaturated amine and dimethyl sulfate or diethyl sulfate said copolymer having a reduced viscosity in a solution of 0.1 gram of copolymer in 100 ml. of benzene at 20° C. of between about 0.1 and 2.0.

2. The lubricating composition of claim 1 wherein the unsaturated amine is a vinyl pyridine or an N-alkylaminoalkyl acrylate or methacrylate.

3. The lubricating composition of claim 1 wherein the amine is 2-methyl-5-vinylpyridine and the dialkyl sulfate is dimethyl sulfate.

4. A lubricating composition which comprises a major amount of a hydrocarbon oil of lubricating viscosity, and a minor amount, sufficient to enhance the detergent characteristics of said oil, of an ammonium sulfate salt which consists essentially of the reaction product of dimethyl sulfate or diethyl sulfate with a succinimide consisting essentially of the addition product of a polyisobutenyl succinic anhydride and a polyalkylenepolyamine having at least 2 alkylene groups and at least 3 amino groups.

5. The lubricating composition of claim 4 wherein said polyalkylenepolyamine is a polyethylenepolyamine.

References Cited

UNITED STATES PATENTS

| | | | |
|---|---|---|---|
| 3,102,862 | 9/1963 | Herbert et al | 252—48.6 X |
| 3,265,673 | 8/1966 | Richards et al. | 252—48.6 X |
| 3,268,494 | 8/1966 | Herbert et al. | 252—48.6 X |
| 3,278,500 | 10/1966 | Bailey et al. | 252—48.6 X |
| 3,337,458 | 8/1967 | Bauer et al. | 252—48.6 |
| 3,238,276 | 3/1966 | La Combe | 260—898 |
| 3,354,087 | 11/1967 | Bailey et al. | 252—48.6 |

DANIEL E. WYMAN, Primary Examiner

W. CANNON, Assistant Examiner

U.S. Cl. X.R.

252—34; 260—79.3, 567.6